US008218914B2

(12) United States Patent
Kissa

(10) Patent No.: US 8,218,914 B2
(45) Date of Patent: Jul. 10, 2012

(54) ELECTRO-OPTIC DEVICE

(76) Inventor: Karl Kissa, West Simsbury, CT (US)

( * ) Notice: Subject to any disclaimer, the term of this patent is extended or adjusted under 35 U.S.C. 154(b) by 445 days.

(21) Appl. No.: 12/611,612

(22) Filed: Nov. 3, 2009

(65) Prior Publication Data

US 2010/0111464 A1 May 6, 2010

Related U.S. Application Data

(60) Provisional application No. 61/111,052, filed on Nov. 4, 2008.

(51) Int. Cl.
G02F 1/035 (2006.01)
G02F 1/295 (2006.01)
G02B 6/26 (2006.01)
G02B 6/42 (2006.01)

(52) U.S. Cl. .................... 385/2; 385/8; 385/40

(58) Field of Classification Search .................. 385/1, 2, 385/3, 4, 8, 14, 39, 40, 147, 15, 16
See application file for complete search history.

(56) References Cited

U.S. PATENT DOCUMENTS

| 4,754,497 | A | * | 6/1988 | Zwarts | 455/205 |
| 5,074,631 | A | | 12/1991 | Hamano et al. | 385/3 |
| 5,309,001 | A | | 5/1994 | Watanabe et al. | 257/99 |
| 5,394,490 | A | | 2/1995 | Kato et al. | 385/14 |
| 5,895,742 | A | | 4/1999 | Lin | 430/321 |
| 6,192,167 | B1 | | 2/2001 | Kissa et al. | 385/3 |
| 6,678,428 | B2 | | 1/2004 | Seino et al. | 385/2 |
| 6,980,706 | B2 | | 12/2005 | Sugiyama | 385/2 |
| 7,030,460 | B2 | | 4/2006 | Chu et al. | 257/532 |
| 7,127,128 | B2 | * | 10/2006 | Belmonte et al. | 385/2 |
| 7,227,293 | B2 | | 6/2007 | Huang et al. | 310/313 B |
| 7,283,290 | B1 | | 10/2007 | Pannell et al. | 359/285 |
| 7,529,433 | B2 | * | 5/2009 | Kissa et al. | 385/8 |
| 7,551,094 | B2 | | 6/2009 | Veerasamy | 340/602 |
| 7,844,149 | B2 | * | 11/2010 | Kissa et al. | 385/40 |

OTHER PUBLICATIONS

Izutsu et al., "Compact 111-Gbit/s integrated RZ-DQPSK modulator using hybrid assembly technique with silica-based PLCs and LiNbO₃ devices" by Yamada, et al., Optical Fiber Communication/National Fiber Optic Engineers Conference, Feb. 2008, paper OThC3.
Ymada et al., "Integrated Optical SSB Modulator/Frequency Shifter" by Izutsu, et. al., IEEE Journal of Quantum Electronics, 1981, vol. QE-17, pp. 2225-2227.

* cited by examiner

Primary Examiner — Akm Ullah
(74) Attorney, Agent, or Firm — Matthew A. Pequignot; Pequignot + Myers LLC

(57) ABSTRACT

The present invention provides an electro-optic device comprising three or more radio-frequency (RF) signal electrodes, which each include an input segment. The input segments of the three or more RF-signal electrodes are arranged in a fractal pattern followed in an RF-signal transit direction by a parallel-bend pattern. Advantageously, this arrangement allows matching of RF-signal transit times of the input segments and near matching of RF-signal losses of the input segments.

20 Claims, 9 Drawing Sheets

ELECTRO-OPTIC DEVICE

CROSS-REFERENCE TO RELATED APPLICATIONS

The present invention claims priority from U.S. Patent Application Ser. No. 61/111,052 to Kissa et al., filed on Nov. 4, 2008, which is incorporated herein by reference.

TECHNICAL FIELD

The present invention relates to an electro-optic device and, in particular, to an electro-optic device comprising three or more RF-signal electrodes.

BACKGROUND OF THE INVENTION

In optical communication networks, electro-optic devices are routinely employed to modulate optical signals through electro-optic interaction. With reference to FIGS. 1A and 1B, a prior-art electro-optic device 100 known as a dual-drive Mach-Zehnder (DDMZ) modulator is suitable for long reach and very long reach applications. The electro-optic device 100 includes an input port 101, which is followed in an optical-signal transit direction by a Mach-Zehnder interferometer (MZI) 102 having independently modulated arms, which is followed by an output port 103. Similar electro-optic devices are disclosed in U.S. Pat. No. 6,980,706 to Sugiyama, issued on Dec. 27, 2005, in U.S. Pat. No. 6,678,428 to Seino, et al., issued on Jan. 13, 2004, in U.S. Pat. No. 6,192,167 to Kissa, et al., issued on Feb. 20, 2001, and in U.S. Pat. No. 5,074,631 to Hamano, et al., issued on Dec. 24, 1991, which are incorporated herein by reference.

The electro-optic device 100 comprises an electro-optic substrate 110, which includes two optical waveguides 111 for propagating two optical signals, as part of the MZI 102. Two radio-frequency (RF) signal electrodes 120 for propagating two RF signals to modulate the two optical signals through electro-optic interaction are supported by the electro-optic substrate 110. RF-ground electrodes for grounding, which are omitted from FIGS. 1A and 1B for clarity, are also supported by the electro-optic substrate 110.

The RF-signal electrodes 120 each include an input segment 121 for receiving an RF signal, an interaction segment 122, which follows the input segment 121 in an RF-signal transit direction, for producing an electric field in one of the two optical waveguides 111 in response to the RF signal, and an output segment 123 which follows the interaction segment 122 in the RF-signal transit direction, for transmitting the RF signal. In some instances, the electro-optic substrate 110 is of z-cut LiNbO$_3$, and the waveguides 111 are each disposed directly under an interaction segment 122, as illustrated in FIG. 1. In other instances, the electro-optic substrate 110 is of x-cut LiNbO$_3$, and the waveguides 111 are each disposed between the interaction segment 122 of an RF-signal electrode 120 and an RF-ground electrode. The input segments 121 are each connected to a respective input bond pad 124, and the output segments 123 are each connected to a respective output bond pad 125.

With particular reference to FIG. 1B, the input segments 121 of the RF-signal electrodes 120 are arranged in a branched pattern 150 followed in the RF-signal transit direction by a parallel-bend pattern 160. Advantageously, this arrangement allows matching of RF-signal transit times of the input segments 121 and near matching of RF-signal losses of the input segments 121, as required for more complex modulation formats.

The branched pattern 150 has two branches of different lengths, each formed by a sub-segment of one input segment 121a or 121b. At one end of the branched pattern 150, the input bond pads 124 are spaced at a separation $S_1$, which is, typically, set to a minimum value providing an acceptable level of electrical crosstalk. At the other end of the branched pattern 150, the parallel-bend pattern 160, which connects the input segments 121 to the interaction segments 122, includes a final sub-segment of each input segment 121. The final sub-segments of the input segments 121 are approximately parallel to one another and each include a final bend. The final bend of one input segment 121a is of radius $R_3$, and the final bend of the other input segment 121b is of radius $R_2$, such that the final sub-segments of the input segments 121 are spaced at a separation $S_b$, as are the interaction segments 122. The radius $R_2$ is set to a minimum value providing an acceptable level of RF-signal bend loss, and the separation $S_b$ is set to a minimum value providing an acceptable level of electro-optic crosstalk.

In the branched pattern 150, the sub-segments of the input segments 121 each include a first bend, a straight section, and a second bend. The first bends of the sub-segments of both input segments 121 are of radius $R_1$, the straight section of the sub-segment of one input segment 121a is of length $L_1$, the straight section of the sub-segment of the other input segment 121b is of length $L_2$, and the second bends of the sub-segments of both input segments 121 are of radius $R_2$. As is the radius $R_2$, the radius $R_1$ is set to a minimum value providing an acceptable level of RF-signal bend loss.

The length difference ($L_2-L_1$) between the straight sections of the branched pattern 150 introduces an electrical-length difference $\Delta L_{e,s1}$ of the branched pattern 150, which is given by Equation (1):

$$\Delta L_{e,s1} = n_s(L_2-L_1), \qquad (1)$$

where $n_s$ is a microwave index of refraction of for the straight sections of the electro-optic substrate 110. Likewise, the radius difference ($R_3-R_2$) between the final bends of the parallel-bend pattern 160 introduces an electrical-length difference $\Delta L_{e,b1}$ of the parallel-bend pattern 160, which is given by Equation (2):

$$\Delta L_{e,b1} = \frac{\pi}{2}n_b(R_3 - R_2), \qquad (2)$$

where $n_b$ is a microwave index of refraction for the bends of the electro-optic substrate 110.

Note that, in some instances, the microwave index of refraction $n_s$ for the straight sections may not equal the microwave index refraction $n_b$ for the bends. For example, when the electro-optic substrate 110 is of x-cut LiNbO$_3$, the microwave index of refraction $n_z$ for an RF-signal propagating along the z-axis of the crystal is different from the microwave index of refraction $n_x$ for an RF-signal propagating along the y-axis of the crystal. In such instances, if the straight sections are aligned with the y-axis, then the microwave index of refraction $n_s$ for the straight sections is equal to $n_y$, and the microwave index of refraction $n_b$ for the bends is equal to $(n_y+n_z)/2$.

As the radius $R_3$ is equal to a sum of the radius $R_2$ and the separation $S_b$, the radius difference in Equation (1) may be replaced by the separation $S_b$, giving Equation (3):

$$\Delta L_{e,b1} = \frac{\pi}{2} n_b S_b. \quad (3)$$

To match the electrical lengths of the input segments 121, the electrical-length difference of the branched pattern 150 is set to equal the electrical-length difference of the parallel-bend pattern 160, giving Equation (4):

$$L_2 - L_1 = \frac{\pi}{2} \frac{n_b}{n_s} S_b. \quad (4)$$

As required by the geometry of the branched pattern 150, the lengths $L_1$ and $L_2$ must also satisfy Equation (5):

$$L_1 + L_2 + 2R_1 + 2R_2 + S_b = S_1. \quad (5)$$

Therefore, the lengths $L_1$ and $L_2$ may be uniquely determined by solving Equations (4) and (5) simultaneously, in order to match the electrical lengths of the entire input segments 121. Matching of the electrical lengths of the input segments 121 entails that the input segments 121 have substantially equivalent RF-signal transit times, ensuring that the two RF signals have an RF-signal timing skew of substantially zero upon reaching the interaction segments 122 after propagating through the input segments 121.

Furthermore, RF-signal propagation losses of the input segments 121 are nearly matched, because of the near matching of physical lengths that accompanies matching of the electrical lengths of the input segments 121. Additional RF-signal bend losses of the input segments 121 are nearly matched by including the same number of bends of similar radii in the input segments 121. Thus, the input segments 121 have substantially equivalent RF-signal losses.

The electro-optic devices disclosed in U.S. Pat. Nos. 6,980,706, 6,678,428, and in U.S. Pat. No. 6,192,167 have alternative designs that likewise provide an RF-signal timing skew of substantially zero. However, all of the prior-art electro-optic devices mentioned heretofore comprise only two RF-signal electrodes.

An object of the present invention is to overcome the shortcomings of the prior art by providing an electro-optic device comprising three or more RF-signal electrodes including input segments arranged to allow matching of RF-signal transit times of the input segments and near matching of RF-signal losses of the input segments. Advantageously, the input segments of the three or more RF-signal electrodes are arranged in a fractal pattern followed in an RF-signal transit direction by a parallel-bend pattern.

Other types of devices comprising electrodes arranged in different fractal patterns are disclosed in U.S. Pat. No. 7,551,094 to Veerasamy, issued on Jun. 23, 2009, in U.S. Pat. No. 7,283,290 to Pannell, et al., issued on Oct. 16, 2007, in U.S. Pat. No. 7,227,293 to Huang, et al., issued on Jun. 5, 2007, in U.S. Pat. No. 7,030,460 to Chu, et al., issued on Apr. 18, 2006, in U.S. Pat. No. 5,394,490 to Kato, et al., issued on Feb. 28, 1995, and in U.S. Pat. No. 5,309,001 to Watanabe, et al., issued on May 3, 1994, which are incorporated herein by reference.

SUMMARY OF THE INVENTION

Accordingly, the present invention relates to an electro-optic device comprising: an electro-optic substrate including one or more optical waveguides for propagating one or more optical signals; and three or more radio-frequency (RF) signal electrodes, supported by the electro-optic substrate, for propagating three or more RF signals to modulate the one or more optical signals through electro-optic interaction, each RF-signal electrode including: an input segment for receiving an RF signal; an interaction segment following the input segment in an RF-signal transit direction, for producing an electric field in at least one of the one or more optical waveguides in response to the RF signal; and an output segment, following the interaction segment in the RF-signal transit direction, for transmitting the RF signal; wherein the input segments of the three or more RF-signal electrodes are arranged in a fractal pattern followed in the RF-signal transit direction by a parallel-bend pattern.

BRIEF DESCRIPTION OF THE DRAWINGS

The invention will be described in greater detail with reference to the accompanying drawings, wherein.

DETAILED DESCRIPTION

The present invention provides an electro-optic device comprising three or more radio-frequency (RF) signal electrodes including input segments arranged to allow matching of RF-signal transit times of the input segments and near matching of RF-signal losses of the input segments. The advantageous features of the present invention will be described herein in the context of preferred, exemplary embodiments of an electro-optic device. However, those skilled in the art will appreciate that these features could also be implemented in an electro-optic device having a different design.

Figure 1A:
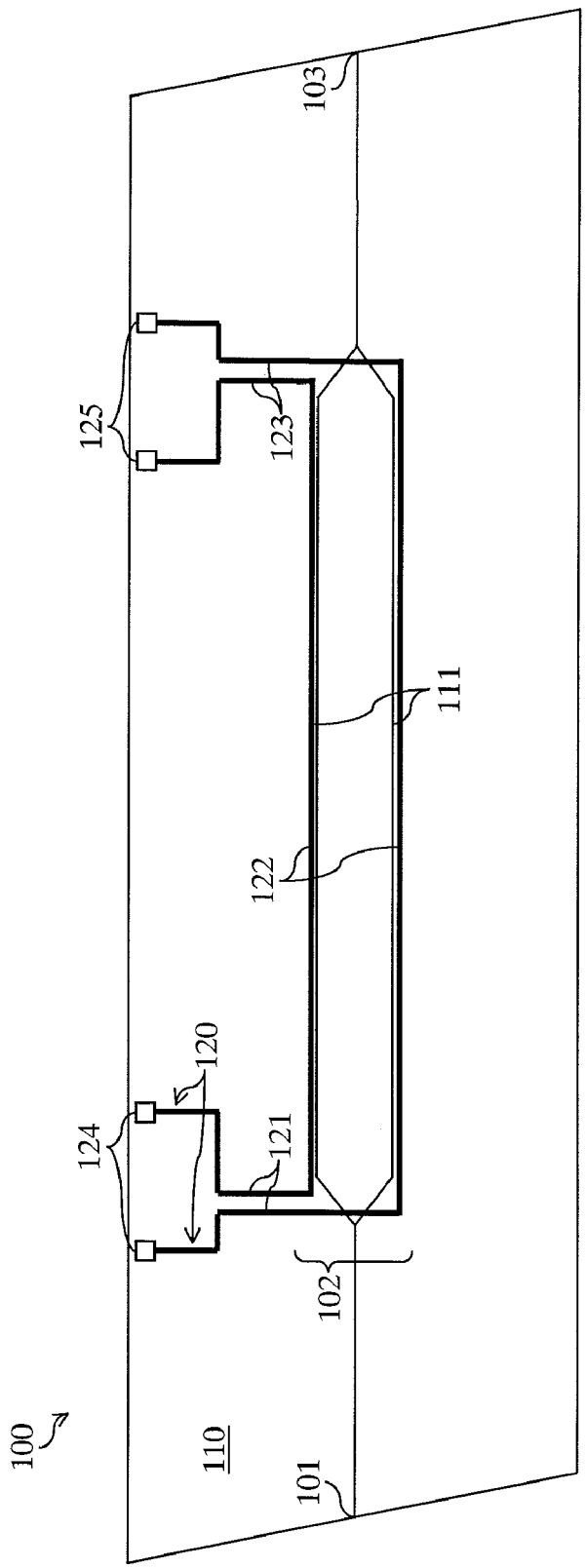
FIG. 1A is a schematic illustration of a top view of a prior-art electro-optic device.
Figure 1B:
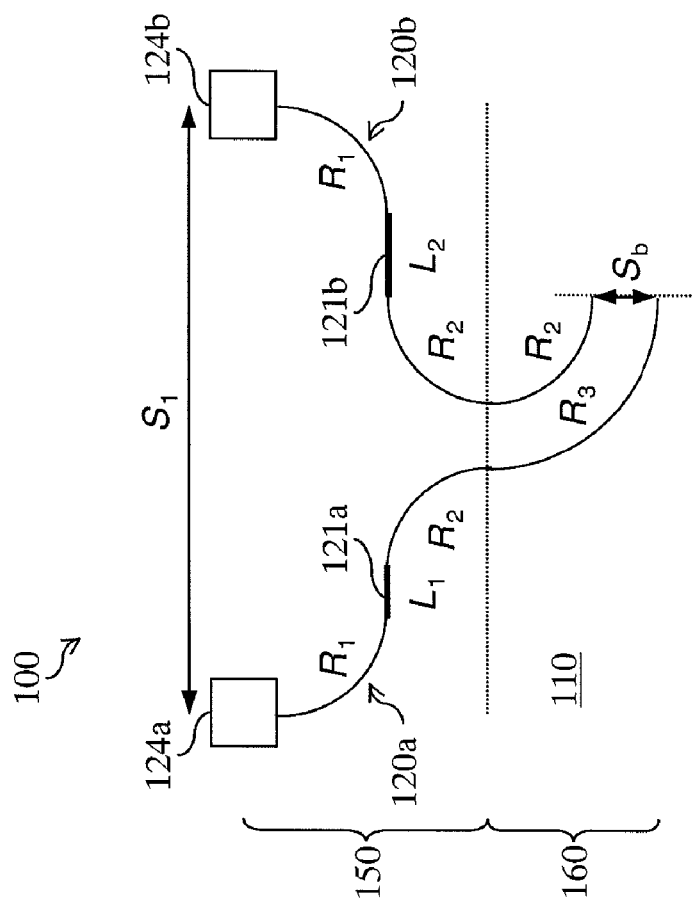
FIG. 1B is a schematic illustration of a top view of an input-segment portion of the electro-optic device of FIG. 1A.
Figure 2A:
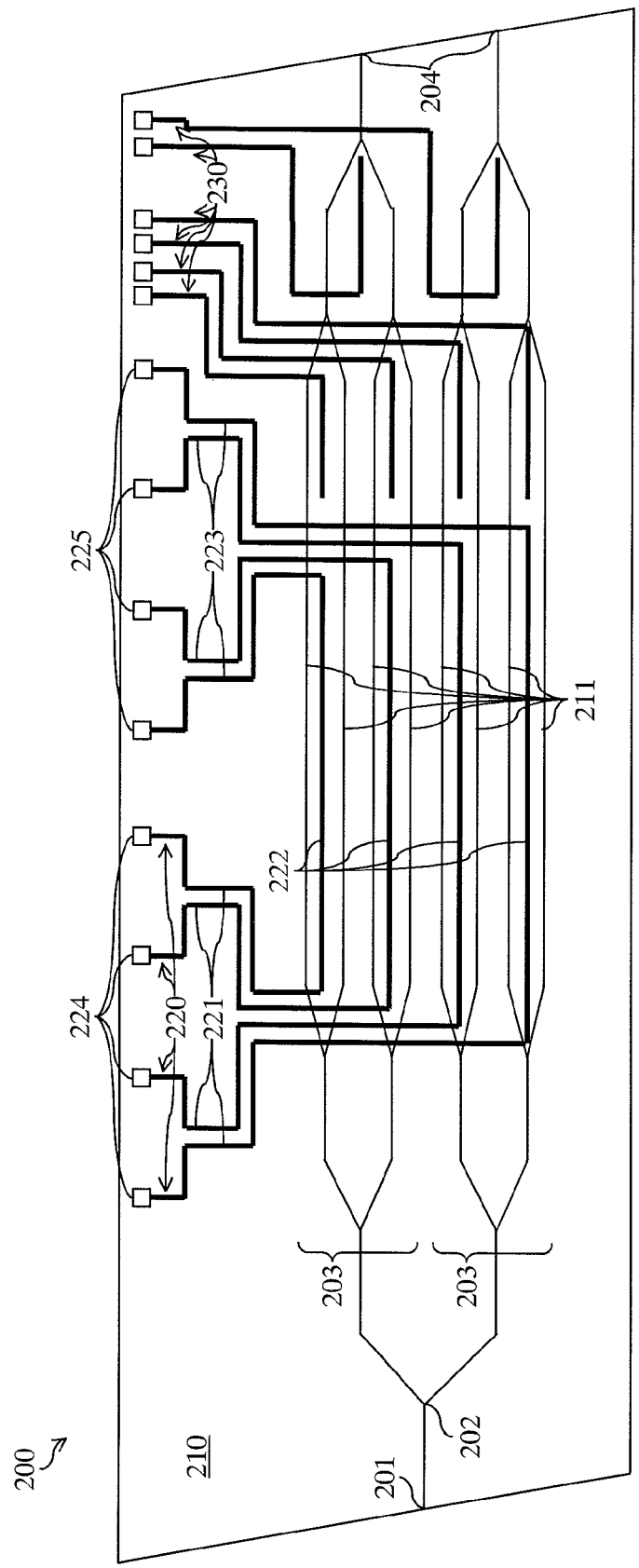
FIG. 2A is a schematic illustration of a top view of a first embodiment of an electro-optic device according to the present invention.
Figure 2B:
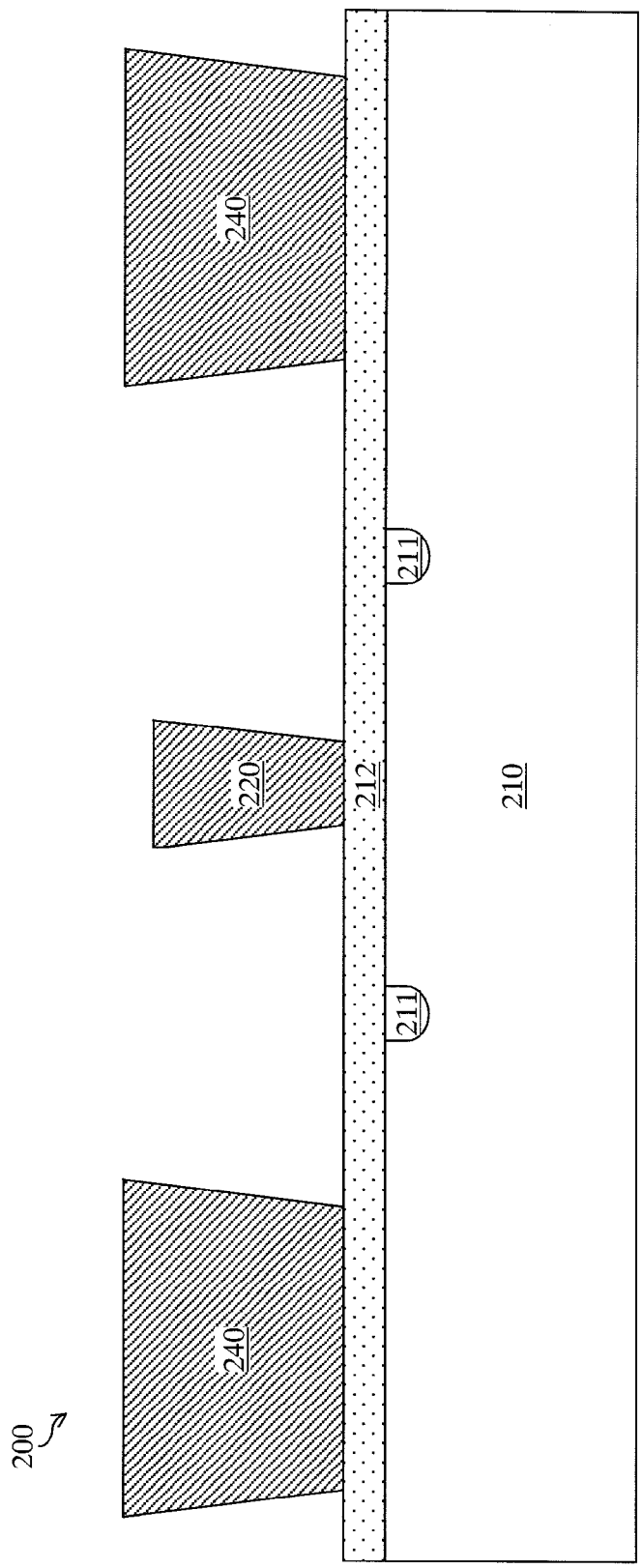
FIG. 2B is a schematic illustration of a cross-sectional view of an electrode-structure portion of the electro-optic device of FIG. 2A.
Figure 2C:
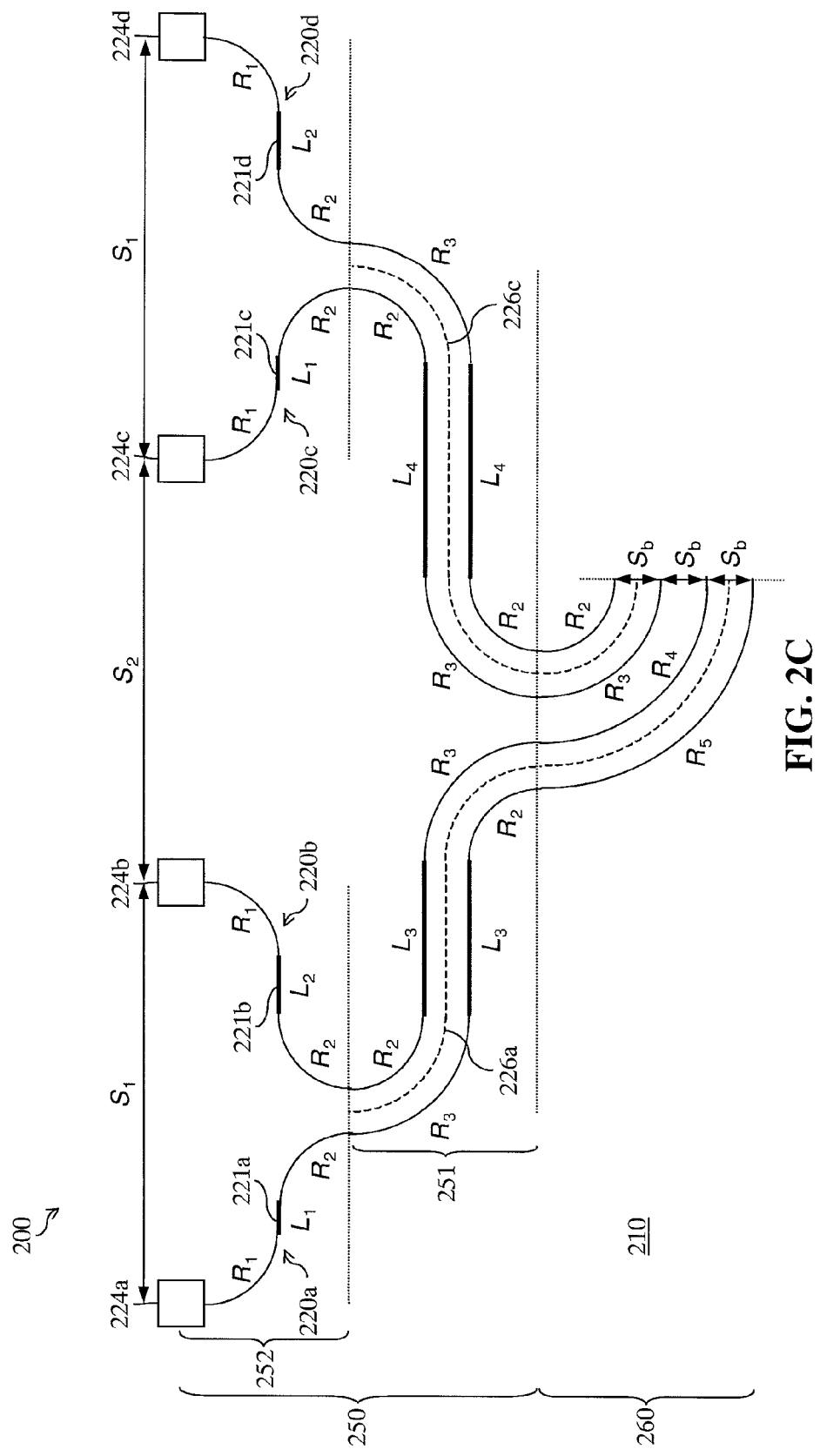
FIG. 2C is a schematic illustration of a top view of an input-segment portion of the electro-optic device of FIGS. 2A and 2B.

With reference to FIGS. 2A to 2C, a first embodiment of an electro-optic device 200 according to the present invention is known as a quad-parallel Mach-Zehnder (QPMZ) modulator. The electro-optic device 200 comprises an input port 201, which is followed in an optical-signal transit direction by an optical splitter 202, which is followed by two dual-parallel Mach-Zehnder (DPMZ) modulators 203, which are followed by two output ports 204. Each DPMZ modulator 203 includes two simple Mach-Zehnder interferometers (MZIs) in a nested configuration.

The electro-optic device 200 comprises an electro-optic substrate 210, which includes eight optical waveguides 211 for propagating eight optical signals, as part of the two DPMZ modulators 203. Four RF-signal electrodes 220 for propagating four RF signals to modulate the eight optical signals through electro-optic interaction are supported by the electro-optic substrate 210. Six bias electrodes 230 for steady-state phase shifting of the optical signals, as well as 16 RF-ground electrodes 240 and six bias-ground electrodes for grounding, which are omitted from FIGS. 2A and 2C for clarity, are also supported by the electro-optic substrate 210. Other embodiments may comprise any number of bias electrodes 230, RF-ground electrodes 240, and bias-ground electrodes, provided they comprise any number of one or more optical waveguides 211 and any number of three or more RF-signal electrodes 220.

In the first embodiment, the electro-optic substrate 210 is, preferably, of x-cut $LiNbO_3$, whereas in other embodiments, the electro-optic substrate 210 may, preferably, be of z-cut $LiNbO_3$. The optical waveguides 211 are, typically, formed in the electro-optic substrate 210 by indiffusion of titanium. The RF-signal electrodes 220, bias electrodes 230, RF-ground electrodes 240, and bias-ground electrodes are, typically, of gold, but may also be of copper or of another metal with a high conductivity.

With particular reference to FIG. 2B, in the first embodiment, the RF-signal electrodes 220 are each included in a respective coplanar waveguide (CPW) traveling-wave electrode structure, together with two RF-ground electrodes 240. A buffer layer 212 for matching velocities of the RF signals and the optical signals is, preferably, disposed on the electro-optic substrate 210, and the RF-signal electrodes 220 and RF-ground electrodes 240 are, preferably, disposed on the buffer layer 212. If biasing is achieved with separate bias electrodes 230, as in the first embodiment, the buffer layer 212 is, typically, of undoped $SiO_2$ or of benzocyclobutene (BCB), as disclosed in U.S. Pat. No. 5,895,742 to Lin, issued on Apr. 20, 1999, which is incorporated herein by reference.

In embodiments in which the electro-optic substrate 210 is of z-cut $LiNbO_3$, the buffer layer 212 is, typically, of $SiO_2$ doped sufficiently to prevent charging of the buffer layer 212, and a thin bleed layer for bleeding off charge produced by the pyroelectric effect during temperature transients, which is, typically, of $Ta_xSi_yN_z$, of $Ti_xSi_yN_z$, or of doped silicon, may be disposed on the buffer layer 212. The RF-signal electrodes 220 and the RF-ground electrodes 240 may then be disposed on the bleed layer.

In the first embodiment, the RF-signal electrodes 220 each include an input segment 221 for receiving an RF signal, an interaction segment 222, which follows the input segment 221 in an RF-signal transit direction, for producing an electric field in two of the optical waveguides 211 in response to the RF signal, and an output segment 223, which follows the interaction segment 222 in the RF-signal transit direction, for transmitting the RF signal. In other embodiments, the interaction segment 222 of each RF-signal electrode 220 may be for producing an electric field in any number of one or more optical waveguides 211.

In the first embodiment, in which the electro-optic substrate 210 is, preferably, of x-cut $LiNbO_3$, the waveguides 211 are each disposed between the interaction segment 222 of an RF-signal electrode 220 and an RF-ground electrode 240, as illustrated in FIGS. 2A and 2B. Alternatively, in embodiments in which the electro-optic substrate 210 is of z-cut $LiNbO_3$, the waveguides 211 may each be disposed directly under an interaction segment 222.

In the first embodiment, the input segments 221 are each connected to a respective input bond pad 224, which is supported by the electro-optic substrate 210, and the output segments 223 are each connected to a respective output bond pad 225, which is likewise supported by the electro-optic substrate 210.

Advantageously, the input bond pads 224 are arranged collinearly along an edge of the electro-optic substrate 210, allowing all RF interfaces to the electro-optic device 200 to be disposed on one side of the electro-optic device 200. The RF interfaces may be RF connectors, RF feedthroughs, RF pins, or any type of RF conductors for connecting the electro-optic device 200 to a circuit board. When the packaged or bare electro-optic device 200 is mounted on the circuit board, driver circuits may be grouped together on the circuit board, facilitating the layout of the circuit board and making it easier to ensure that all the RF signals arrive at the RF interfaces simultaneously.

In the first embodiment, the output bond pads 225 are, preferably, also arranged collinearly at the same edge of the electro-optic substrate 210 as the input bond pads 224. However, in other embodiments, some or all of the output bond pads 225 may be disposed on the opposite edge of the electro-optic substrate 210 as the input bond pads 224.

The input segments 221 of the RF-signal electrodes 220 are arranged in a fractal pattern 250 followed in the RF-signal transit direction by a parallel-bend pattern 260. Advantageously, this arrangement allows matching of RF-signal transit times of the input segments 221 and near matching of RF-signal losses of the input segments 221, as required for more complex modulation formats such as quadrature phase shift keying (QPSK) or differential quadrature phase shift keying (DQPSK).

The interaction segments 222 of the RF-signal electrodes 220 are arranged in parallel-line pattern. In the parallel-line pattern, the interaction segments 222, which are substantially straight, are arranged approximately parallel to one another. In some embodiments, the separation between the interaction segments 222 may vary along their length. For example, the interaction segments 222 may follow the paths of the MZIs formed by the waveguides 211, such that the separation between the interaction segments 222 is smallest at the ends of each interaction segment 222 and largest in the middle of each interaction segment 222, as disclosed in U.S. Pat. No. 6,980,706. Such a design allows electro-optic interaction to begin along part of a waveguide-splitter structure of a MZI, thereby reducing an overall length of the electro-optic device 200.

In one variation of the first embodiment, the output segments 223 of the RF-signal electrodes 220 are arranged in a parallel-bend pattern followed in the RF-signal transit direction by a fractal pattern, as illustrated in FIG. 2A, similarly to the input segments 221. When there are significant RF-signal reflections, it is preferable that the parallel-bend pattern and the fractal pattern of the output segments 223 be the same as those of the input segments 221 to match ripples in frequency response of the RF-signal electrodes 220. However, when RF-signal reflections are negligible, the parallel-bend pattern and the fractal pattern of the output segments 223 may be different from those of the input segments 221.

Figure 2D:
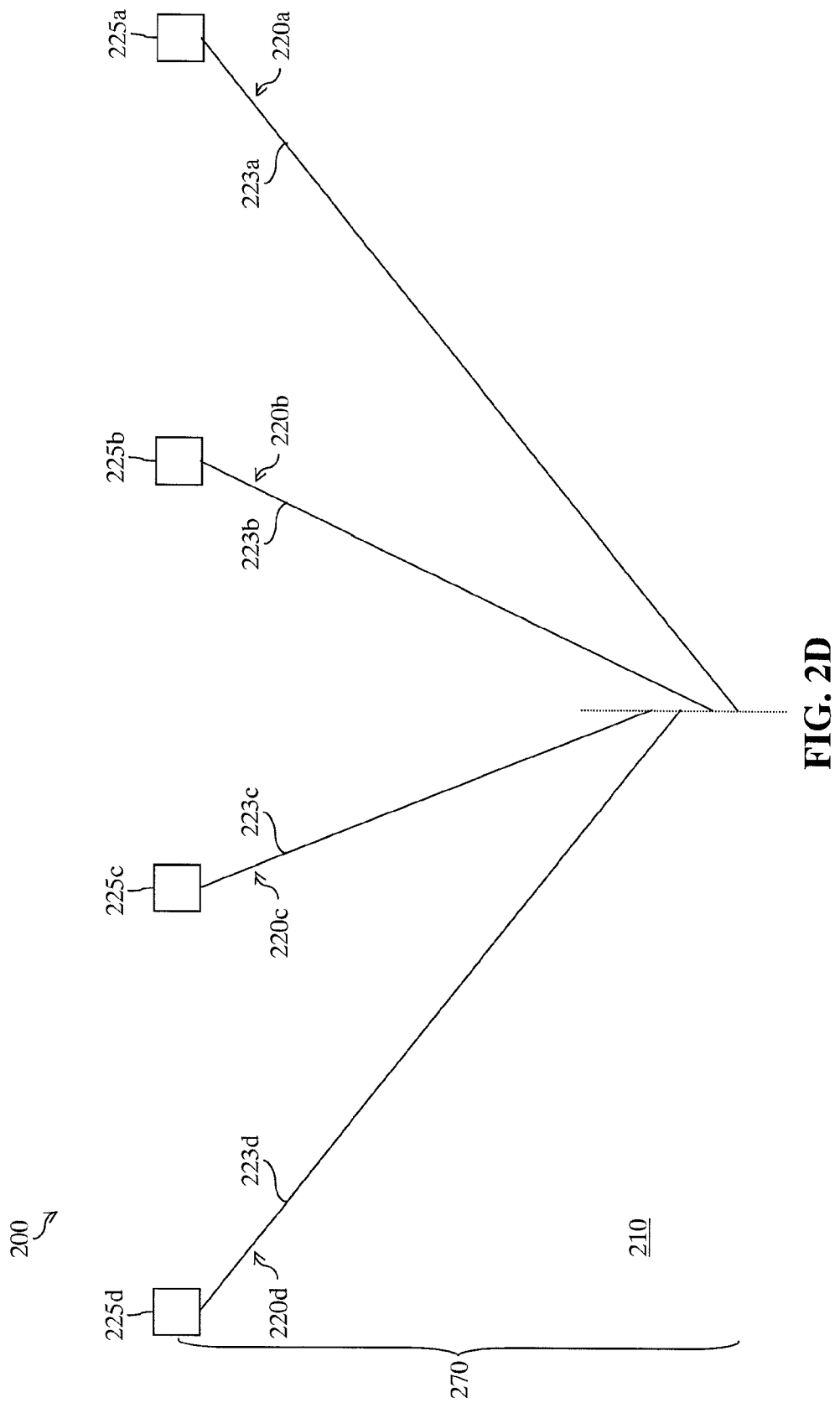
FIG. 2D is a schematic illustration of a top view of an output-segment portion of a variation of the electro-optic device of FIGS. 2A to 2C.

With reference to FIG. 2D, in another variation of the first embodiment, the output segments 223 are arranged in a minimum-length pattern 270, which requires less space. In the minimum-length pattern 270, the output segments 223, which are substantially straight, have minimum lengths corresponding to minimum separations between the respective output bond pads 225 and the respective interaction segments 222.

Note that, in this arrangement, the output segments 223 do not have matched RF-signal transit times nor nearly matched RF-signal losses. However, the timing and losses of the RF signals is much less critical after modulation in the interaction segments 222, especially when RF-signal reflections are negligible. In other embodiments, the output segments 223 may have a different arrangement, in which the RF-signal transit times and RF losses of the output segments 223 may or may not be matched.

With particular reference to FIG. 2C, in the first embodiment, the fractal pattern 250 of the input segments 221 includes a first-iteration level 252 followed in the RF-signal transit direction by a base level 251. The first-iteration level 252 and the base level 251 each include a sub-segment of each input segment 221. In the first-iteration level 252, the sub-segments of the four input segments 221 are arranged into two first-iteration figures, which are reduced and translated copies of a base figure. In the base level 251, the sub-segments of the four input segments 221 are arranged into the base figure.

The base figure and, accordingly, the first-iteration figures each have two branches of different lengths. In the base figure, each branch is formed by the sub-segments of two input segments 221a and 221b, or 221c and 221d, which are arranged approximately parallel to each other. In the first-iteration figures, each branch is formed by the sub-segment of one input segment 221a, 221b, 221c, or 221d. In other embodiments, the fractal pattern 250 may include any number of one or more iteration levels including reduced and translated copies of a base figure, in addition to a base level 251 including the base figure.

In the first embodiment, at one end of the fractal pattern 250, two pairs of input bond pads 224a and 224b, and 224c and 224d are spaced at a separation $S_1$, which corresponds to a width of each first-iteration figure, and one pair of input bond pads 224b and 224c is spaced at a separation $S_2$, which corresponds to a separation between the two first-iteration figures. The separations $S_1$ and $S_2$ are set to minimum values providing acceptable levels of electrical crosstalk, which are, typically, between 0.5 mm and 5 mm. In some instances, the separations $S_1$ and $S_2$ are substantially equivalent.

At the other end of the fractal pattern 250, the parallel-bend pattern 260, which connects the fractal pattern 250 of the input segments 221 to the parallel-line pattern of the interaction segments 222, includes a final sub-segment of each input segment 221. In the first embodiment, the final sub-segments of the input segments 221 are arranged approximately parallel to one another and each include a final bend. The final bend of one input segment 221a is of radius $R_5$, the final bend of another input segment 221b is of radius $R_4$, the final bend of another input segment 221c is of radius $R_3$, and the final bend of another input segment 221d is of radius $R_2$, such that the final bends of the input segments 221 are spaced at a separation $S_b$, as are the interaction segments 222. The radius $R_2$ is set to a minimum value providing an acceptable level of RF-signal bend loss, which is, typically, between 10 μm and 300 μm, and the separation $S_b$ is set to a minimum value providing an acceptable level of electro-optic crosstalk, which is, typically, between 50 μm and 500 μm. Typically, the separations $S_1$ and $S_2$ of the input bond pads 224 must be larger than the separation $S_b$ of the interaction segments 222, because the input bond pads 224 are, generally, larger in width than the interaction segments 222. The larger radii $R_3$, $R_4$, and $R_5$ are, typically, between 0.1 mm and 2 mm. In other embodiments, the final sub-segments of the input segments 221 in the parallel-bend pattern 260 may include any number of one or more bends, as described hereafter.

In the fractal pattern 250, the sub-segments of the input segments 221 each include a first bend, a straight section, and a second bend. In each first-iteration figure of the first-iteration level 252, the first bends of the sub-segments of both input segments 221 are of radius $R_1$, the straight section of the sub-segment of one input segment 221a or 221c is of length $L_1$, the straight section of the sub-segment of the other input segment 221b or 221d is of length $L_2$, and the second bends of the sub-segments of both input segments 221 are of radius $R_2$. As is the radius $R_2$, the radius $R_1$ is set to a minimum value providing an acceptable level of RF-signal bend loss, which is, typically, between 10 μm and 300 μm. In some instances, the radii $R_1$ and $R_2$ are substantially equivalent.

As explained heretofore for the prior-art electro-optic device 100, the length difference ($L_2-L_1$) between the straight sections of each first-iteration figure of the first-iteration level 252 introduces an electrical-length difference $\Delta L_{e,s1}$ of the first-iteration level 252, which is given by Equation (1). That is, the first-iteration level 252 imparts the input segments 221b and 221d with an electrical-length difference of $\Delta L_{e,s1}$ relative to the input segments 221a and 221c, respectively, as listed in Table 1. As also explained heretofore, the lengths $L_1$ and $L_2$ required to match the electrical lengths of the entire input segments 221, may be determined by solving Equations (4) and (5) simultaneously.

TABLE 1

| | Electrical-length differences of input segments | | | |
|---|---|---|---|---|
| | 221a | 221b | 221c | 221d |
| First-iteration level 252 | 0 | $\Delta L_{e,s1}$ | 0 | $\Delta L_{e,s1}$ |
| Base level 251 | 0 | 0 | $2\Delta L_{e,s1}$ | $2\Delta L_{e,s1}$ |
| Fractal pattern 250 | 0 | $\Delta L_{e,s1}$ | $2\Delta L_{e,s1}$ | $3\Delta L_{e,s1}$ |
| Parallel-bend pattern 260 | $3\Delta L_{e,s1}$ | $2\Delta L_{e,s1}$ | $\Delta L_{e,s1}$ | 0 |
| Entire input segment 221 | $3\Delta L_{e,s1}$ | $3\Delta L_{e,s1}$ | $3\Delta L_{e,s1}$ | $3\Delta L_{e,s1}$ |

In the base figure of the base level 251, in one branch, the first bend of the sub-segment of one input segment 221a is of radius $R_3$, the first bend of the sub-segment of the other input segment 221b is of radius $R_2$, the straight sections of the sub-segments of both input segments 221a and 222b are of length $L_3$, the second bend of the sub-segment of one input segment 221a is of radius $R_2$, and the second bend of the sub-segment of the other input segment 221b is of radius $R_3$. In the other branch, the first bend of the sub-segment of one input segment 221c is of radius $R_2$, the first bend of the sub-segment of the other input segment 221d is of radius $R_3$, the straight sections of the sub-segments of both input segments 221c and 222d are of length $L_4$, the second bend of the sub-segment of one input segment 221c is of radius $R_3$, and the second bend of the sub-segment of the other input segment 221d is of radius $R_2$.

Alternatively, the branches may be considered to each include a first bend, a straight section, and a second bend along a symmetry line 226a or 226c, as illustrated in FIG. 2C. The first bends of both branches are of radius $(R_2+R_3)/2$, the straight section of one branch is of length $L_3$, the straight section of the other branch is of length $L_4$, and the second bends of both branches are of radius $(R_2+R_3)/2$.

The length difference ($L_4-L_3$) between the straight sections of the base level 251 introduces an electrical-length difference $\Delta L_{e,s2}$ of the base level 251, which is given by Equation (6):

$$\Delta L_{e,s2} = n_s(L_4-L_3). \tag{6}$$

That is, the base level 251 imparts the input segments 221$c$ and 221$d$ of one branch with an electrical-length difference of $\Delta L_{e,s2}$ relative to the input segments 221$a$ and 221$b$ of the other branch.

To determine the lengths $L_3$ and $L_4$ required to match the electrical lengths of the entire input segments 221, the symmetry lines 226 illustrated in FIG. 2C may again be considered. In the parallel-bend pattern 260, the final bend defined by one symmetry line 226$a$ is of radius $(R_2+R_3)/2$, and the final bend defined by the other symmetry line 226$c$ is of radius $(R_4+R_5)/2$. The radius difference $[(R_4+R_5)/2-(R_2+R_3)/2]$ between the final bends defined by the symmetry lines 226 of the parallel-bend pattern 260 introduces an electrical-length difference $\Delta L_{e,b2}$ of the parallel-bend pattern 260, which is given by Equation (7):

$$\Delta L_{e,b2} = \frac{\pi}{2}n_b\left[\left(\frac{R_4+R_5}{2}\right)-\left(\frac{R_2+R_3}{2}\right)\right]. \quad (7)$$

As the radius $(R_4+R_5)/2$ is equal to a sum of the radius $(R_2+R_3)/2$ and the separation $2S_b$, the radius difference in Equation (7) may be replaced by the separation $2S_b$, giving Equation (8):

$$\Delta L_{e,b2} = \frac{\pi}{2}n_b 2S_b. \quad (8)$$

To match the electrical lengths of the entire input segments 221, the electrical-length difference of the base level 251 is set to equal the electrical-length difference of the parallel-bend pattern 260, giving Equation (9):

$$L_4 - L_3 = \frac{\pi}{2}\frac{n_b}{n_s}2S_b. \quad (9)$$

Upon comparison of Equation (9) to Equation (4), it is apparent that the length difference of the base level 251 is equal to twice the length difference of the first-iteration level 252. Accordingly, the electrical-length difference $\Delta L_{e,s2}$ of the base level 251 is equal to twice the electrical-length difference $\Delta L_{e,s1}$ of the first-iteration level 252, as expressed by Equation (10):

$$\Delta L_{e,s2} = 2\Delta L_{e,s1}. \quad (10)$$

Thus, the electrical-length difference imparted by the base level 251 to the input segments 221$c$ and 221$d$ relative to the input segments 221$a$ and 221$b$ is of $2\Delta L_{e,s1}$, as listed in Table 1.

As required by the geometry of the fractal pattern 250, the lengths $L_3$ and $L_4$ must also satisfy Equation (11):

$$L_1+L_2+L_3L_4+2R_1+6R_2+5S_b=2S_1+S_2. \quad (11)$$

Therefore, the lengths $L_3$ and $L_4$ may be uniquely determined by solving Equations (9) and (11) simultaneously, similarly to how the lengths $L_1$ and $L_2$ may be determined by solving Equations (4) and (5) simultaneously, in order to match the electrical lengths of the entire input segments 221.

When the lengths $L_1$, $L_2$, $L_3$, and $L_4$ are determined as described heretofore, the electrical-length differences imparted by the fractal pattern 250 as a whole, which correspond to a total of the electrical-length differences imparted by the first-iteration level 252 and by the base level 251, range from 0 to $3\Delta L_{e,s1}$, as listed in Table 1. Correspondingly, the electrical-length differences imparted by the parallel-bend pattern 260 range from $3\Delta L_{e,s1}$ to 0, as listed in Table 1, canceling the electrical-length differences imparted by the fractal pattern 250. That is, the electrical-length differences of the entire input segments 221, which correspond to a total of the electrical-length differences imparted by the fractal pattern 250 and by the parallel-bend pattern 260, are all equal to $3\Delta L_{e,s1}$, as listed in Table 1.

Thus, the input segments 221 have matched electrical lengths in the first embodiment, which entails that the input segments 221 have substantially equivalent RF-signal transit times. The fractal pattern 250 introduces an RF-signal timing skew, which is substantially eliminated by the parallel-bend pattern 260, ensuring that the four RF signals have an RF-signal timing skew of substantially zero upon reaching the interaction segments 222 after propagating through the input segments 221.

In other embodiments, the lengths $L_1$, $L_2$, $L_3$, and $L_4$ may be selected such that the input segments 221 have RF-signal transit times that differ by predetermined amounts. For example, predetermined differences in RF-signal transit time resulting from interconnects between the RF interfaces and the input bond pads 224 may be cancelled by corresponding predetermined differences in RF-signal transit time resulting from the input segments 221. That is, an RF-signal timing skew introduced by the interconnects may be substantially eliminated by the input segments 221, again ensuring that the four RF signals have an RF-signal timing skew of substantially zero upon reaching the interaction segments 222 after propagating through the input segments 221. Likewise, an RF-signal timing skew introduced on the circuit board may be substantially eliminated by the input segments 221, if the different RF-signal transit times of the input segments 221 are selected appropriately.

Advantageously, the arrangement of the input segments 221 in the fractal pattern 250 and the parallel-bend pattern 260 results in near matching of the RF-signal losses of the input segments 221, unlike most prior-art arrangements. The RF-signal propagation losses of the input segments 221 are nearly matched, because of the near matching of physical lengths of the input segments 221 that accompanies matching of the electrical lengths of the input segments 221. Additional RF-signal bend losses of the input segments 221 are nearly matched by including the same number of bends of similar radii in the input segments 221. Thus, the input segments 221 have substantially equivalent RF-signal losses.

Furthermore, contrary to what might be expected, the arrangement of the input segments 221 in the fractal pattern 250 and the parallel-bend pattern 260 does not dramatically increase the length of the input segments 221 relative to prior-art arrangements. For example, the input segments 221 are only approximately 20% longer than if they were arranged in a minimum-length pattern, as described heretofore, having the same separations $S_1$, $S_2$, and $S_b$).

The advantages described for the first embodiment can also be extended to embodiments including other numbers of three or more RF-signal electrodes. In general, $2^N$ input segments of $2^N$ RF-signal electrodes are connected to $2^N$ input bond pads, where N is greater than or equal to 2, and are arranged in a fractal pattern followed in an RF-signal transit direction by a parallel-bend pattern. The fractal pattern includes N levels, that is, a base level and (N-1) iteration levels.

As described heretofore, the levels of the fractal pattern each include one or more figures having two branches of different lengths, the number of figures included in each level being doubled in each subsequent level. In the ith level, where i=1, 2, ... N, one branch of each figure has a shorter length of $L_{short,i}$, and the other branch of each figure has a longer length of $L_{long,i}$. The lengths $L_{short,i}$ and $L_{long,i}$ required to match the electrical-length differences of the entire input segments may be determined by solving Equation (12), which is a generalization of Equations (4) and (9):

$$L_{long,i} - L_{short,i} = \frac{\pi}{2}\frac{n_b}{n_s}2^{i-1}S_b, \quad i = 1, 2, \ldots N, \quad (12)$$

simultaneously with a second equation derived from the geometry of the fractal pattern, which is constrained by the spacing of the input bond pads. The length difference $(L_{short,i}-L_{short,i})$ between the straight sections of the ith level, introduces an electrical-length difference $\Delta L_{e,si}$ of the ith level, which is doubled in each subsequent level.

Figure 3A:
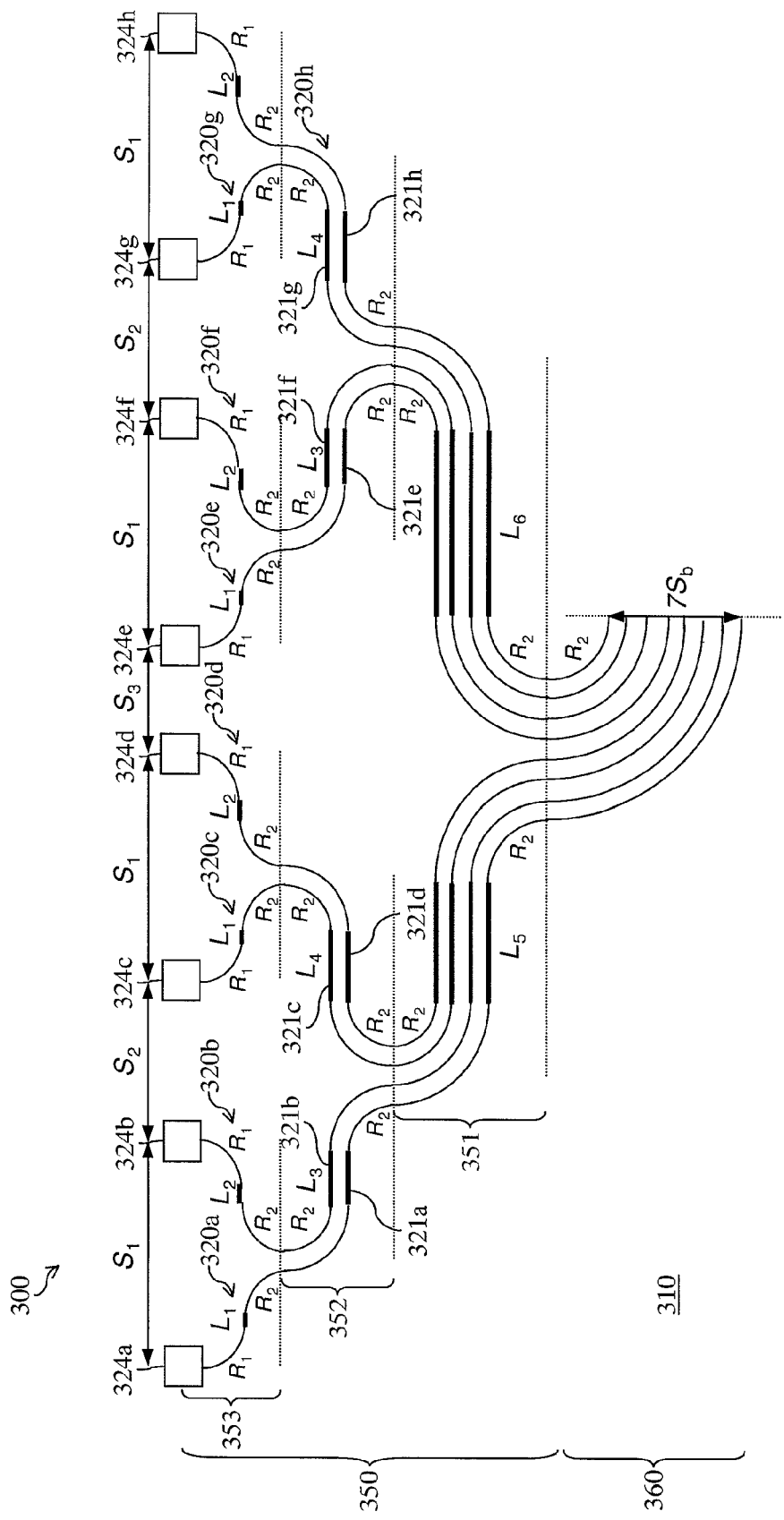
FIG. 3A is a schematic illustration of a top view of an input-segment portion of a second embodiment of an electro-optic device according to the present invention.

For example, with reference to FIG. 3A, a second embodiment of an electro-optic device 300 according to the present invention comprises an electro-optic substrate 310 and eight RF-signal electrodes 320 supported by the electro-optic substrate 310, which each include an input segment 321. The eight input segments 321 are connected to eight input bond pads 324, which are spaced at separations $S_1$, $S_2$, and $S_3$.

The input segments 321 are arranged in a fractal pattern 350 followed in an RF-signal transit direction by a parallel-bend pattern 360. The fractal pattern 350 includes three levels, that is, a second-iteration level 353, followed in the RF-signal transit direction by a first-iteration level 352, followed by a base level 351. The second-iteration level 353, the first-iteration level 352, and the base level 351 each include a sub-segment of each input segment 321, which includes a first bend, a straight section, and a second bend. The smallest bends are of radii $R_1$ and $R_2$, and the straight sections are of lengths $L_1$, $L_2$, $L_3$, $L_4$, $L_5$, and $L_6$. The parallel-bend pattern 360 includes a final sub-segment of each input segment 321, which includes a final bend. The smallest final bend is of radius $R_2$, and the final bends of the input segments 321 are spaced at a separation $S_b$.

As explained heretofore, for input segments 321 having matched electrical lengths, the length difference $(L_2-L_1)$ of the second-iteration level 353 is given by Equation (4), which corresponds to Equation (12) with i=1, and the length difference $(L_4-L_3)$ of the first-iteration level 352 is given by Equation (9), which corresponds to Equation (12) with i=2. Likewise, the length difference $(L_6-L_5)$ of the base level 351 is given by Equation (13), which corresponds to Equation (12) with i=3:

$$L_6 - L_5 = \frac{\pi}{2}\frac{n_b}{n_s}4S_b. \quad (13)$$

Upon comparison of Equation (13) to Equations (4) and (9), it is apparent that the length difference of the base level 351 is equal to twice the length difference of the first-iteration level 352 or to four times the length difference of the second-iteration level 353. Accordingly, the electrical-length difference $\Delta L_{e,s3}$ of the base level 351 is equal to twice the electrical-length difference $\Delta L_{e,s2}$ of the first-iteration level 352 or to four times the electrical-length difference $\Delta L_{e,s1}$ of the second-iteration level 353, as expressed by Equation (14):

$$\Delta L_{e,s3} = 2\Delta L_{e,s2} = 4\Delta L_{e,s1}. \quad (14)$$

As required by the geometry of the fractal pattern 350, the lengths $L_5$ and $L_6$ must also satisfy Equation (15):

$$L_1+L_2+L_3+L_4+L_5+L_6+2R_1+10R_2+15S_b=4S_1+2S_2+S_3. \quad (15)$$

Therefore, the lengths $L_5$ and $L_6$ may be uniquely determined by solving Equations (13) and (15) simultaneously, in order to match the electrical lengths of the entire input segments 321.

When the lengths $L_1$, $L_2$, $L_3$, $L_4$, $L_5$, and $L_6$ are determined as described heretofore, the electrical-length differences imparted by the fractal pattern 350 as a whole, which correspond to a total of the electrical-length differences imparted by the second-iteration level 353, by the first-iteration level 352, and by the base level 351, range from 0 to $7\Delta L_{e,s1}$, as listed in Table 2. Correspondingly, the electrical-length differences imparted by the parallel-bend pattern 360 range from $7\Delta L_{e,s1}$ to 0, as listed in Table 2, canceling the electrical-length differences imparted by the fractal pattern 350. That is, the electrical-length differences of the entire input segments 321, which correspond to a total of the electrical-length differences imparted by the fractal pattern 350 and by the parallel-bend pattern 360, are all equal to $7\Delta L_{e,s1}$, as listed in Table 2.

TABLE 2

| | Electrical-length differences of input segments | | | | | | | |
|---|---|---|---|---|---|---|---|---|
| | 321a | 321b | 321c | 321d | 321e | 321f | 321g | 321h |
| Second-iteration level 353 | 0 | $\Delta L_{e,s1}$ | 0 | $\Delta L_{e,s1}$ | 0 | $\Delta L_{e,s1}$ | 0 | $\Delta L_{e,s1}$ |
| First-iteration level 352 | 0 | 0 | $2\Delta L_{e,s1}$ | $2\Delta L_{e,s1}$ | 0 | 0 | $2\Delta L_{e,s1}$ | $2\Delta L_{e,s1}$ |
| Base level 351 | 0 | 0 | 0 | 0 | $4\Delta L_{e,s1}$ | $4\Delta L_{e,s1}$ | $4\Delta L_{e,s1}$ | $4\Delta L_{e,s1}$ |
| Fractal pattern 350 | 0 | $\Delta L_{e,s1}$ | $2\Delta L_{e,s1}$ | $3\Delta L_{e,s1}$ | $4\Delta L_{e,s1}$ | $5\Delta L_{e,s1}$ | $6\Delta L_{e,s1}$ | $7\Delta L_{e,s1}$ |
| Parallel-bend pattern 360 | $7\Delta L_{e,s1}$ | $6\Delta L_{e,s1}$ | $5\Delta L_{e,s1}$ | $4\Delta L_{e,s1}$ | $3\Delta L_{e,s1}$ | $2\Delta L_{e,s1}$ | $\Delta L_{e,s1}$ | 0 |
| Entire input segment 321 | $7\Delta L_{e,s1}$ | $7\Delta L_{e,s1}$ | $7\Delta L_{e,s1}$ | $7\Delta L_{e,s1}$ | $7\Delta L_{e,s1}$ | $7\Delta L_{e,s1}$ | $7\Delta L_{e,s1}$ | $7\Delta L_{e,s1}$ |

Thus, the input segments 321 have matched electrical lengths in the second embodiment, which entails that the input segments 321 have substantially equivalent RF-signal transit times. Furthermore, as explained heretofore, the input segments 321 have substantially equivalent RF-signal losses.

Figure 3B:
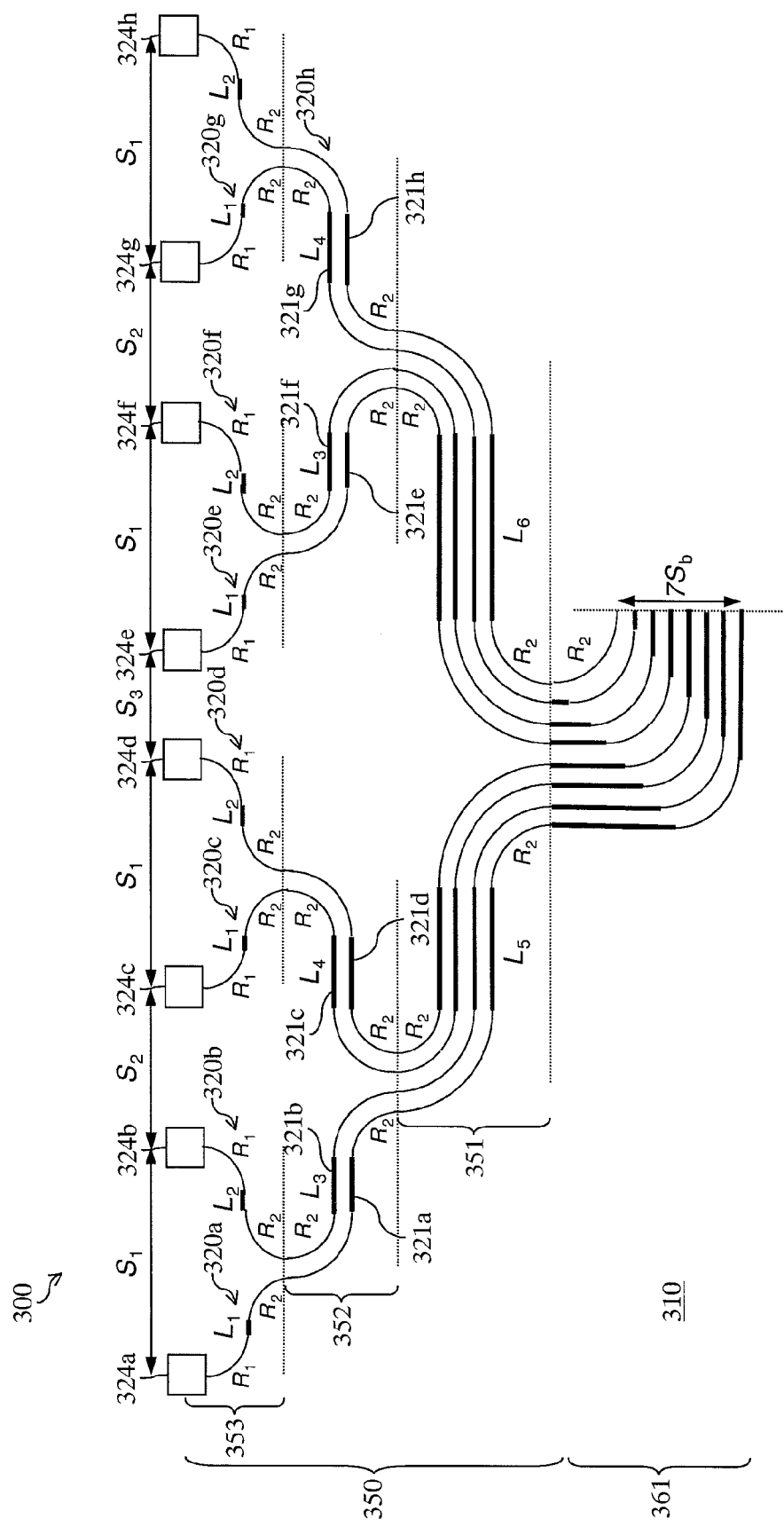
FIG. 3B is a schematic illustration of a top view of an input-segment portion of a variation of the electro-optic device of FIG. 3A.

With reference to FIG. 3B, one variation of the second embodiment includes a parallel-bend pattern 361 having a different arrangement to that illustrated in FIG. 3A. The parallel-bend pattern 361 includes a final sub-segment of each input segment 321, and the final sub-segments of the input segments 321 are approximately, but not perfectly parallel to one another. A shortest final sub-segment includes a final bend of radius $R_2$, and the other final sub-segments each include a first straight section, a final bend of radius $R_2$, and a second straight section. Advantageously, in the parallel-bend pattern 361, all the final bends are of the same radius, which reduces differences in the RF-signal losses of the input segments 321. For this variation, Equation 12 is replaced by Equation 16:

$$L_{long,i} - L_{short,i} = 2\frac{n_b}{n_s}2^{i-1}S_b, \ i = 1, 2, \ldots N. \quad (16)$$

Equations derived from the geometry of the fractal pattern 350, such as Equation 15, remain the same.

Figure 3C:
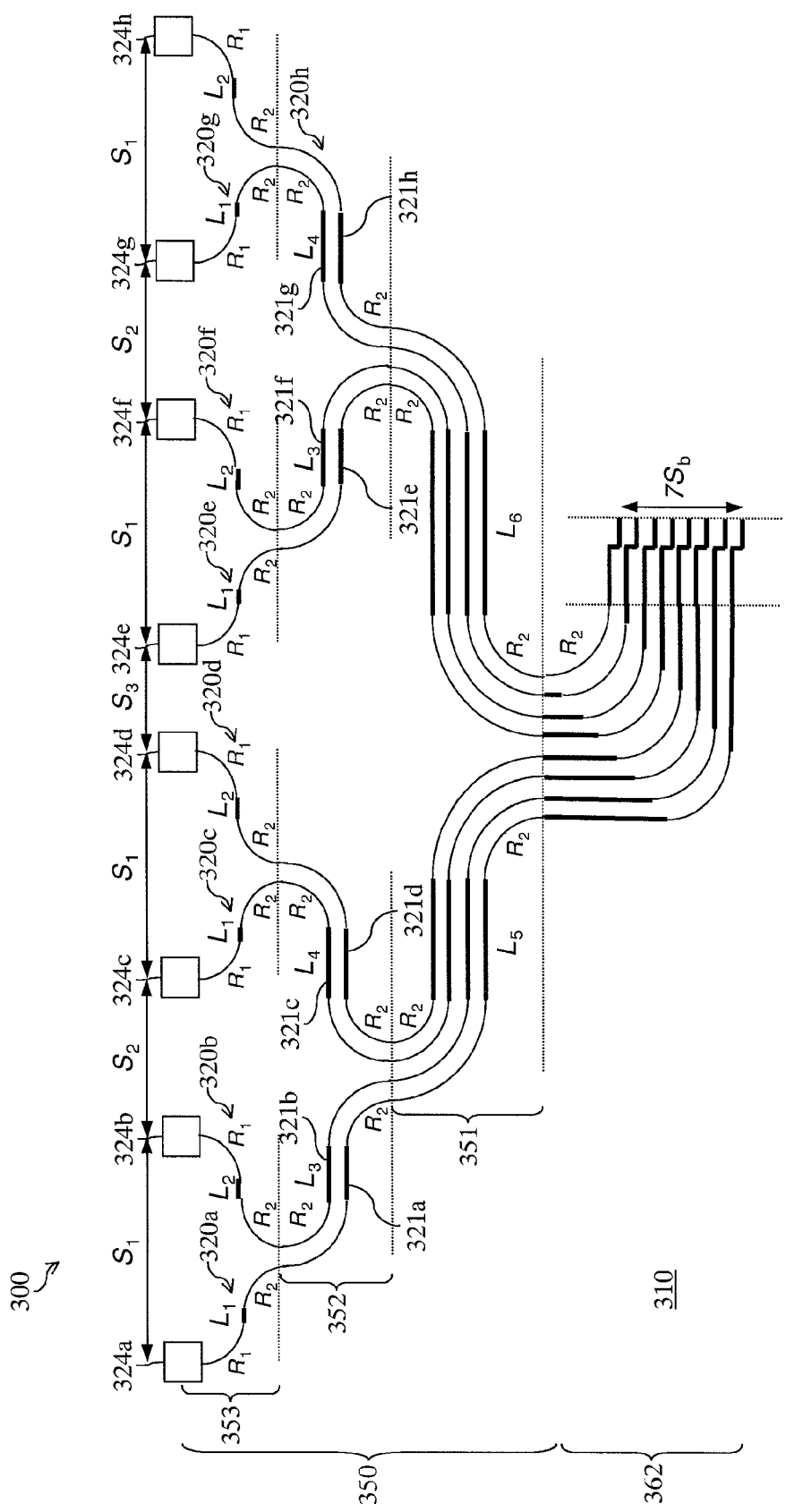
FIG. 3C is a schematic illustration of a top view of an input-segment portion of a variation of the electro-optic device of FIG. 3B.

With reference to FIG. 3C, another variation of the second embodiment includes a parallel-bend pattern 362 having a similar, but different arrangement to that illustrated in FIG. 3B. The parallel-bend pattern 362 includes a final sub-segment of each input segment 321, and the final sub-segments of the input segments 321 are approximately, but not perfectly parallel to one another. As in the parallel-bend pattern 361 illustrated in FIG. 3B, a shortest final sub-segment includes a final bend of radius $R_2$, and the other final sub-segments each include a first straight section, a final bend of radius $R_2$, and a second straight section. The final sub-segments also include three additional straight sections and two additional abrupt bends, which are each bounded by two straight sections. The abrupt bends allow a clearly defined beginning to a parallel-line pattern of interaction segments of the RF-signal electrodes 320. Furthermore, the arrangement of a first abrupt bend followed almost immediately by a second abrupt bend does not substantially increase the RF-signal losses of the input segments 321, as long as the second abrupt bend restores the propagation direction established before the first abrupt bend.

Note that any desired number of RF-signal electrodes greater than $2^{N-1}$ and less than $2^N$ may also be accommodated by the arrangement described heretofore for $2^N$ RF-signal electrodes. Any RF-signal electrodes in excess of the desired number may simply be removed from the arrangement or not used. For example, seven RF-signal electrodes can be accommodated by an arrangement of eight RF-signal electrodes in a three-level fractal pattern followed in an RF-signal transit direction by a parallel-bend pattern by removing or not using one of the eight RF-signal electrodes.

Of course, numerous other embodiments may be envisaged without departing from the spirit and scope of the invention. In particular, the inventive concept of arranging input segments of RF-signal electrodes in a fractal pattern followed in an RF-signal transit direction by a parallel-bend pattern may be applied to any electro-optic device comprising three or more RF-signal electrodes.

I claim:

1. An electro-optic device comprising:
   an electro-optic substrate including one or more optical waveguides for propagating one or more optical signals; and
   three or more radio-frequency (RF) signal electrodes, supported by the electro-optic substrate, for propagating three or more RF signals to modulate the one or more optical signals through electro-optic interaction, each RF-signal electrode including:
   an input segment for receiving an RF signal;
   an interaction segment, following the input segment in an RF-signal transit direction, for producing an electric field in at least one of the one or more optical waveguides in response to the RF signal; and
   an output segment, following the interaction segment in the RF-signal transit direction, for transmitting the RF signal;
   wherein the input segments of the three or more RF-signal electrodes are arranged in a fractal pattern followed in the RF-signal transit direction by a parallel-bend pattern.

2. The electro-optic device of claim 1, wherein the electro-optic device is a quad-parallel Mach-Zehnder (QPMZ) modulator.

3. The electro-optic device of claim 1, wherein the RF-signal electrodes are each included in a respective coplanar waveguide (CPW) traveling-wave electrode structure.

4. The electro-optic device of claim 1, wherein the input segments of the three or more RF-signal electrodes are arranged in the fractal pattern followed in the RF-signal transit direction by the parallel-bend pattern to ensure that the three or more RF signals have an RF-signal timing skew of substantially zero upon reaching the interaction segments after propagating through the input segments.

5. The electro-optic device of claim 4, wherein the input segments of the three or more RF-signal electrodes have substantially equivalent RF-signal transit times and RF-signal losses.

6. The electro-optic device of claim 4, wherein the input segments of the three or more RF-signal electrodes have RF-signal transit times that differ by predetermined amounts and have substantially equivalent RF-signal losses.

7. The electro-optic device of claim 4, wherein the fractal pattern introduces an RF-signal timing skew, and wherein the parallel-bend pattern substantially eliminates the RF-signal timing skew.

8. The electro-optic device of claim 1, wherein the fractal pattern comprises a base level including a base figure, and one or more iteration levels, each iteration level including two or more reduced and translated copies of the base figure.

9. The electro-optic device of claim 8, wherein the base figure and the copies of the base figure each have two branches of different lengths.

10. The electro-optic device of claim 8, wherein the base level and the one or more iteration levels of the fractal pattern each include a sub-segment of each input segment of the three or more RF-signal electrodes, and wherein the parallel-bend pattern includes a final sub-segment of each input segment.

11. The electro-optic device of claim 10, wherein the sub-segments in the fractal pattern each include two bends and a straight section, and wherein the final sub-segments in the parallel-bend pattern each include one or more bends.

12. The electro-optic device of claim 8, wherein the electro-optic device comprises greater than $2^{N-1}$ and less than or equal to $2^N$ RF-signal electrodes, wherein the fractal pattern comprises the base level and (N−1) iteration levels, and wherein N is greater than or equal to two.

13. The electro-optic device of claim 12, wherein the electro-optic device comprises four RF-signal electrodes, and wherein the fractal pattern comprises the base level and one iteration level.

14. The electro-optic device of claim 12, wherein the electro-optic device comprises eight RF-signal electrodes, and wherein the fractal pattern comprises the base level and two iteration levels.

15. The electro-optic device of claim 1, wherein the interaction segments of the three or more RF-signal electrodes are arranged in a parallel-line pattern.

16. The electro-optic device of claim 1, wherein the output segments of the three or more RF-signal electrodes are arranged in a parallel-bend pattern followed in the RF-signal transit direction by a fractal pattern.

17. The electro-optic device of claim 16, wherein the parallel-bend pattern and the fractal pattern of the output segments are the same as those of the input segments.

18. The electro-optic device of claim 1, wherein the output segments of the three or more RF-signal electrodes are arranged in a minimum-length pattern.

19. The electro-optic device of claim 1, further comprising three or more input bond pads supported by the electro-optic substrate, wherein the three or more input bond pads are arranged collinearly along an edge of the electro-optic substrate, and wherein the input segments of the three or more RF-signal electrodes are each connected to a respective input bond pad.

20. The electro-optic device of claim 19, further comprising three or more output bond pads supported by the electro-optic substrate, wherein the three or more output bond pads are arranged collinearly along the same edge of the electro-optic substrate as the three or more input bond pads, and wherein the output segments of the three or more RF-signal electrodes are each connected to a respective output bond pad.

* * * * *